United States Patent
Blackketter et al.

(10) Patent No.: US 6,560,777 B2
(45) Date of Patent: May 6, 2003

(54) BROADCAST ENHANCEMENT TRIGGER ADDRESSED TO MULTIPLE UNIQUELY ADDRESSED INFORMATION RESOURCES

(75) Inventors: Dean J. Blackketter, San Francisco, CA (US); Daniel J. Zigmond, Carnation, WA (US); Timothy F. Park, Menlo Park, CA (US)

(73) Assignee: WebTv Networks, Inc., Mountain View, CA (US)

( * ) Notice: Subject to any disclaimer, the term of this patent is extended or adjusted under 35 U.S.C. 154(b) by 0 days.

(21) Appl. No.: 09/287,984

(22) Filed: Apr. 7, 1999

(65) Prior Publication Data

US 2002/0138849 A1 Sep. 26, 2002

(51) Int. Cl.$^7$ ................................................ H04N 7/173
(52) U.S. Cl. ........................................ 725/110; 725/114
(58) Field of Search ................................. 725/109, 110, 725/111, 112, 91, 92, 93, 114, 115, 116, 117; 709/217, 218, 219; H04N 7/173, 7/16

(56) References Cited

U.S. PATENT DOCUMENTS

| | | | | |
|---|---|---|---|---|
| 5,778,181 A | * | 7/1998 | Hidary et al. | 348/12 |
| 5,787,470 A | * | 7/1998 | DeSimone et al. | 711/124 |
| 5,818,441 A | * | 10/1998 | Throckmorton et al. | 345/328 |
| 5,832,223 A | * | 11/1998 | Hara et al. | 395/200.47 |
| 5,982,445 A | * | 11/1999 | Eyer et al. | 348/461 |
| 6,061,719 A | * | 5/2000 | Bendinelli et al. | 709/218 |
| 6,072,521 A | * | 6/2000 | Harrison et al. | 348/12 |
| 6,360,215 B1 | * | 3/2002 | Judd et al. | 707/3 |

FOREIGN PATENT DOCUMENTS

WO   WO 98/45978   10/1998

OTHER PUBLICATIONS

Request For Comments (RFC) 791, "Internet Protocol, DARPA Internet Program Protocol Specification," Sep. 1981.

Advanced Television Enhancement Forum Specification (ATVEF), Version 1.1 revision 26, (Feb. 2, 1999).

W3C, "HTML 4.0 Specification," Chapters 1–18 (Apr. 1998), identified as page "http://www.w3.org/TR/REC–html40/".

ECMA—European association for standardizing information and communication systems, "Standard ECMA–262, $2^{nd}$ Edition" (Aug. 1998).

W3C, "Document Object Model (DOM) Level 1 Specification" (Oct. 1998), identified as page http://www.w3.org/TR/1998/REC–DOM–Level–1–19981001/DOM.txt.

R. Panabaker, S. Wegerif, and D. Zigmond, "The Transmission of IP Over the Vertical Blanking Interval of a Television Signal," (Feb. 1999).

S. Deering, "Host Extensions for IP Multicasting" (Aug. 1989).

Electronic Industries Association EIA–608, "Recommended Practice for Line 21 Data Service" (Sep. 1994).

Electronic Industries Association EIA–746A, "Transport of Internet Uniform Resource Locator (URL) Information Using Text–2 (T–2) Service" (Sep. 1998).

J. Postel, "User Datagram Protocol," (Aug. 1980), identified as page "ftp://ftp.isi.edu/in–notes/rfc768.txt".

* cited by examiner

Primary Examiner—Chris Grant
(74) Attorney, Agent, or Firm—Workman, Nydegger & Seeley

(57) ABSTRACT

The invention is a method and apparatus for simultaneously enhancing two or more unique HTML pages (information resources) using a single enhancement trigger. A content creator, (e.g., a program producer, broadcaster, affiliate, cable company, or satellite provider), embeds an enhancement trigger in a data service channel of a broadcast video signal. The embedded enhancement trigger includes a collective resource identifier that identifies two or more information resources, such as a collection of different HTML pages. The content creator can then broadcast the enhancement trigger to the several information resources to enhance them all using a single enhancement trigger.

27 Claims, 6 Drawing Sheets

BROADCAST ENHANCEMENT TRIGGER ADDRESSED TO MULTIPLE UNIQUELY ADDRESSED INFORMATION RESOURCES

TECHNICAL FIELD

The invention relates generally to supplementing broadcast television programming with information of interest to broadcast viewers. More specifically, the invention relates to broadcasting television enhancements addressed to several differently addressed information resources.

BACKGROUND

The Internet is a worldwide collection of networks and gateways. The Internet includes a backbone of high-speed data communication lines between major nodes, consisting of thousands of commercial, government, educational, and other computer systems that route data and messages. The World Wide Web (the Web) is a collection of formatted hypertext pages located on numerous computer systems around the world that are logically connected by the Internet. The Web has become a valuable resource for information relating many subjects.

Web browsers—software providing user interfaces to the Web—allow individuals to access Internet content from personal computers. Internet terminals, such as those pioneered by WebTV Networks, Inc., the assignee of the present invention, have made the Web accessible to an even larger segment of the population by providing Web access without a personal computer. Internet terminals (commonly referred to as set-top boxes) provide Web access using an ordinary television (TV) set as a display and a remote control or wireless keyboard for user input.

FIG. 1 (prior art) illustrates a basic configuration of an Internet system and broadcast television network 100. Network 100 includes a pair of clients 110 and a receiver/client 112. Receiver/client 112 is so named because it operates both as a television receiver and as an Internet client. Hereafter, receiver/client 112 is referred to as receiver 112 for simplicity.

Clients 110 and receiver 112 are coupled to a modem pool 120 via direct-dial, bi-directional data connections 130 (which may be telephone (POTS, i.e., "plain old telephone service"), cable, satellite forward channels, ISDN (Integrated Services Digital Network), or any other similar type of connection. Modem pool 120 is typically coupled to a number of remote servers 140 via a network infrastructure, such as the Internet 160. An additional server 150 specifically supports receiver 112.

Clients 110 and receiver 112 communicate bi-directionally with servers 140 and 150 through modem pool 120 and the Internet 160. Modem pool 120 is typical of those found today throughout the world providing access to the Internet and private networks. In addition to communicating with servers 140 and 150, receiver 112 receives broadcast data and video from a broadcast television network 170 via, e.g., antennas 175 or a cable network (not shown).

FIG. 2 (prior art) illustrates an embodiment of receiver 112. Receiver 112 includes set-top box 200, an ordinary analog television set 210, and a remote control 220. Set-top box 200 may be integrated with television set 210. Television set 210 displays video data, including a graphical user interface, conveyed from set-top box 200 by a video link 230. Video link 230 is an RF (radio frequency), S-video, composite video, or other video link.

Set-top box 200 includes hardware and software for receiving and decoding a broadcast video signal 240, such as an NTSC, PAL, SECAM, or other TV system video signal, and for providing video data to the television set via video link 230. Set-top box 200 also includes hardware and/or software for providing a user with a graphical user interface 250 capable of displaying Web pages (e.g., HTML or XML pages) and broadcast video. User interface 250 can notify the user of the presence of encoded data embedded in the video signal. The notification may be audible, visual, or a combination of the two. For example, user interface 250 might temporarily display an icon in a portion of the screen.

Set-top box 200 may include both a standard modem and an ISDN modem, such that the communication link between set-top box 200 and server 150 (FIG. 1) can be either a telephone (POTS) connection 260 or an ISDN connection 270. Set-top box 200 receives power through a power line 280.

A user operates remote control 220 to control set-top box 200 in browsing the Web, sending e-mail, and performing other Internet-related functions. Set-top box 200 receives commands from remote control 220 via an infrared (IR) communication link 290. A keyboard (not shown) may also be included.

For a more detailed discussion of receiver 112, see related U.S. patent application Ser. No. 09/287,985 entitled "Communicating Scripts in a Data Service Channel of a Video Signal," f by Dean J. Blackketter and Daniel J. Zigmond, filed Apr. 7, 1999, the contents of which are incorporated herein by reference.

FIG. 3 illustrates a communication system 300, including a content provider 302 and two content receivers 304 and 306. Content provider 302 includes two content sources, a web server 308 and a broadcast signal source 310. Content provider 302 communicates information to receivers 304 and 306 from web server 308 via the Internet 312 and from signal source 310 via a broadcast signal 314. Internet 312 is understood to include all modems, lines, and other intervening components required to communicate between server 308 and receivers 304 and 306.

Each of receivers 304 and 306 is configured to display Web pages, broadcast television, or both. Web pages are typically downloaded over the Internet, but may also be received from a broadcast television signal or retrieved from a local memory source, such as a disk drive. In each case, however, the Web pages are stored locally on the receivers.

Receiver 304 displays a broadcast weather show 316 along with an associated weather page 318. Receiver 306 displays a broadcast baseball game 320 and an associated sports page 322. Sports page 322 includes links 324 that provide viewers access to language-specific Web pages offering additional information to enhance the experience of watching broadcast baseball game 320. When one of links 324 is activated, as by selecting the link using a mouse or other pointing device, receiver 306 displays baseball game 320 in conjunction with a language-specific page that provides information specific to the game. Receiver 306 is depicted with three language-specific examples: an English-language specific page 326, a Spanish-language specific page 328, and a German-language specific page 330.

Each of pages 326, 328, and 330 includes a sponsor field 332 and a score field 334. These fields are identified in the language of choice, and can be modified, or "enhanced," in response to an enhancement trigger received from content provider 302 either via broadcast signal 314 or Internet 320. Sports pages 326, 328, and 330 can thus be synchronized with baseball game 320.

In the present example, content provider 302 maintains Web content for enhancing broadcast television shows at "http://www.broadcaster.com/" (www.broadcaster.com) on server 308. Www.broadcaster.com has various directory levels that include content specific to particular broadcast television channels and to particular Web pages associated with those channels. In the example, www.broadcaster.com includes a subdirectory "programs" that in turn includes both "sports" and "news" subdirectories. The "news" subdirectory includes a "weather" subdirectory with the requisite information to display weather page 318. The universal resource identifier, or URI, for weather page 318 is: "http://www.broadcaster.com/programs/weather/".

Sports page 322 and language-specific pages 326, 328, and 330 are similarly specified in the subdirectories of www.broadcaster.com.

1. The URI for sports page 322 is "http://www.broadcaster.com/programs/sports/".
2. The URI for English-language page 326 is "http://www.broadcaster.com/programs/sports/english.html".
3. The URI for Spanish-language page 328 is "http://www.broadcaster.com/programs/sports/spanish.html".
4. The URI for German-language page 326 is "http://www.broadcaster.com/programs/sports/german.html".

Content provider 302 can update the information on any of pages 318, 322, 326, 328, and 330 by directing an enhancement trigger to the specified page. For example, the displayed score on page 334 might be updated by broadcasting the following enhancement trigger:

```
<http://www.broadcaster.com/programs/sports/english.html>
    [script:score(4,7)][95f6]
``` where the first portion (in angle brackets) is the URI, the second portion (in brackets) is script to be conveyed to the targeted Web page, and the third portion (in brackets) is a checksum. Enhancement-trigger syntax and function are discussed below. For a more detailed treatment of the use of such triggers, see the above-incorporated application entitled "Communicating Scripts in a Data Service Channel of a Video Signal," by Daniel J. Zigmond and Dean J. Blackketter.

Enhancement triggers are typically broadcast in a data service channel of a broadcast video signal. Unfortunately, such service channels typically offer limited bandwidth. Broadcasting complex enhancements can therefore be time consuming, particularly when a number of uniquely addressed Web pages require updating. For example, each language-specific sports page 326, 328, and 330 would require separate enhancement triggers to update their respective score and sponsor fields 334 and 332. There is therefore a need for a means of reducing the bandwidth required to update, or enhance, collections of related Web pages.

SUMMARY

The present invention is directed to methods and apparatus for reducing the bandwidth required to enhance two or more differently addressed information resources, such as Web pages. In accordance with the invention, a content creator, (e.g., a program producer, broadcaster, affiliate, cable company, or satellite provider), embeds an enhancement trigger in a data service channel of a broadcast video signal. The embedded enhancement trigger includes a collective resource identifier that identifies a collection of unique information resources. The enhancement trigger, so directed, is capable of enhancing a number of related or unrelated information resources. For example, a content creator can update several unique Web pages simultaneously using a single enhancement trigger.

The enhancement triggers are broadcast in the data service channel of a broadcast video signal. Each receiver adapted to interpret trigger content begins with an information resource, such as a Web page, resident in memory. The receiver can obtain such a resource via the Internet, broadcast video, or from local storage. The receiver tunes into a selected broadcast signal and monitors the data service channel of that signal for enhancement triggers that are addressed to the unique information resource resident on the receiver or to a collection of information resources that include the information resource resident on the receiver. Upon receipt of such an enhancement trigger, the receiver executes the enhancement contained within the trigger to alter the information resource and/or displayed video defined by the resource. In this way, a single enhancement trigger affects a change in two or more information resources.

Other features of the present invention will be apparent from the accompanying drawings and from the detailed description that follows.

DETAILED DESCRIPTION OF THE INVENTION

Figure 1:
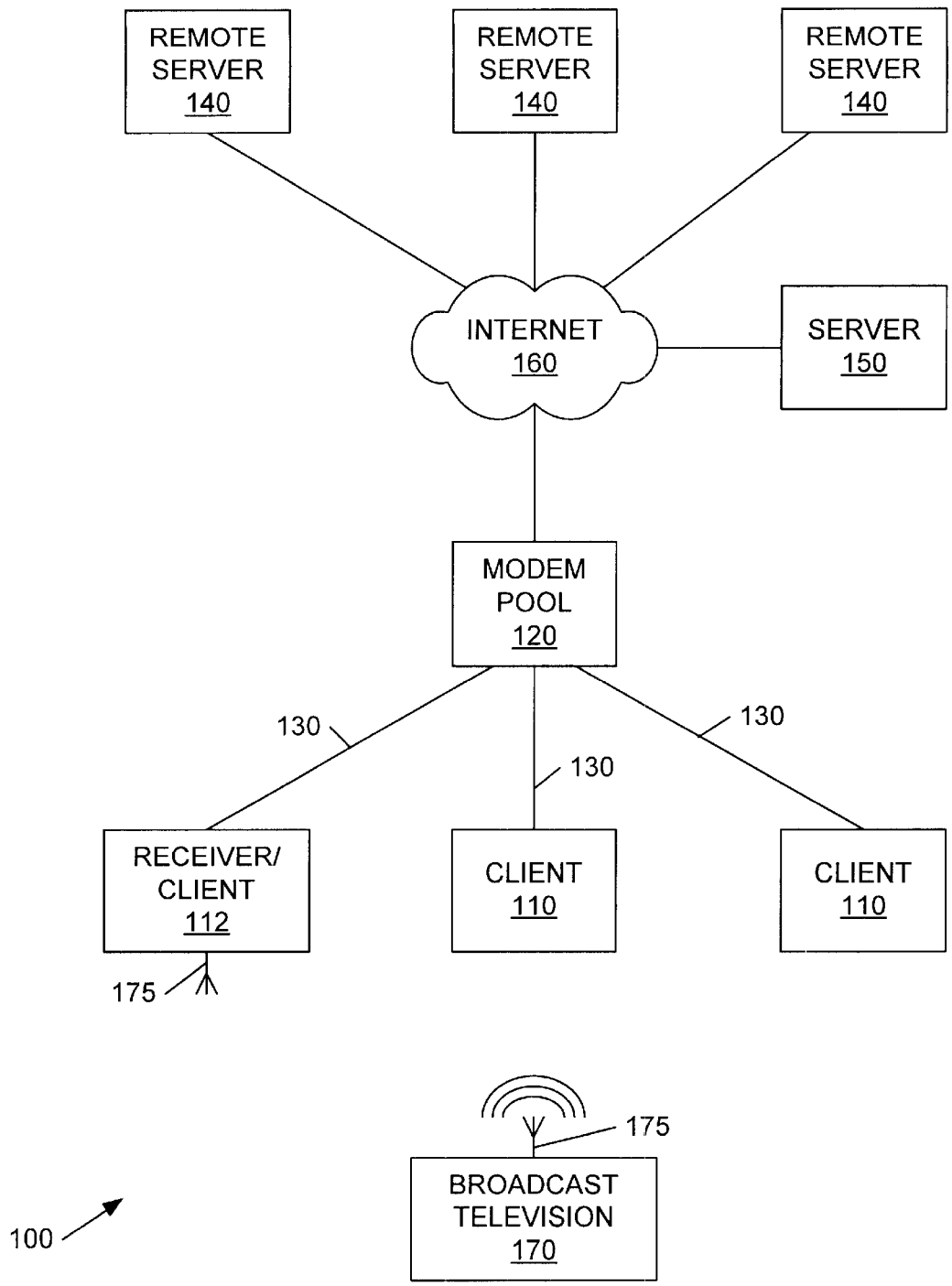
FIG. 1 (prior art) illustrates a basic configuration of an Internet system network 100.
Figure 2:
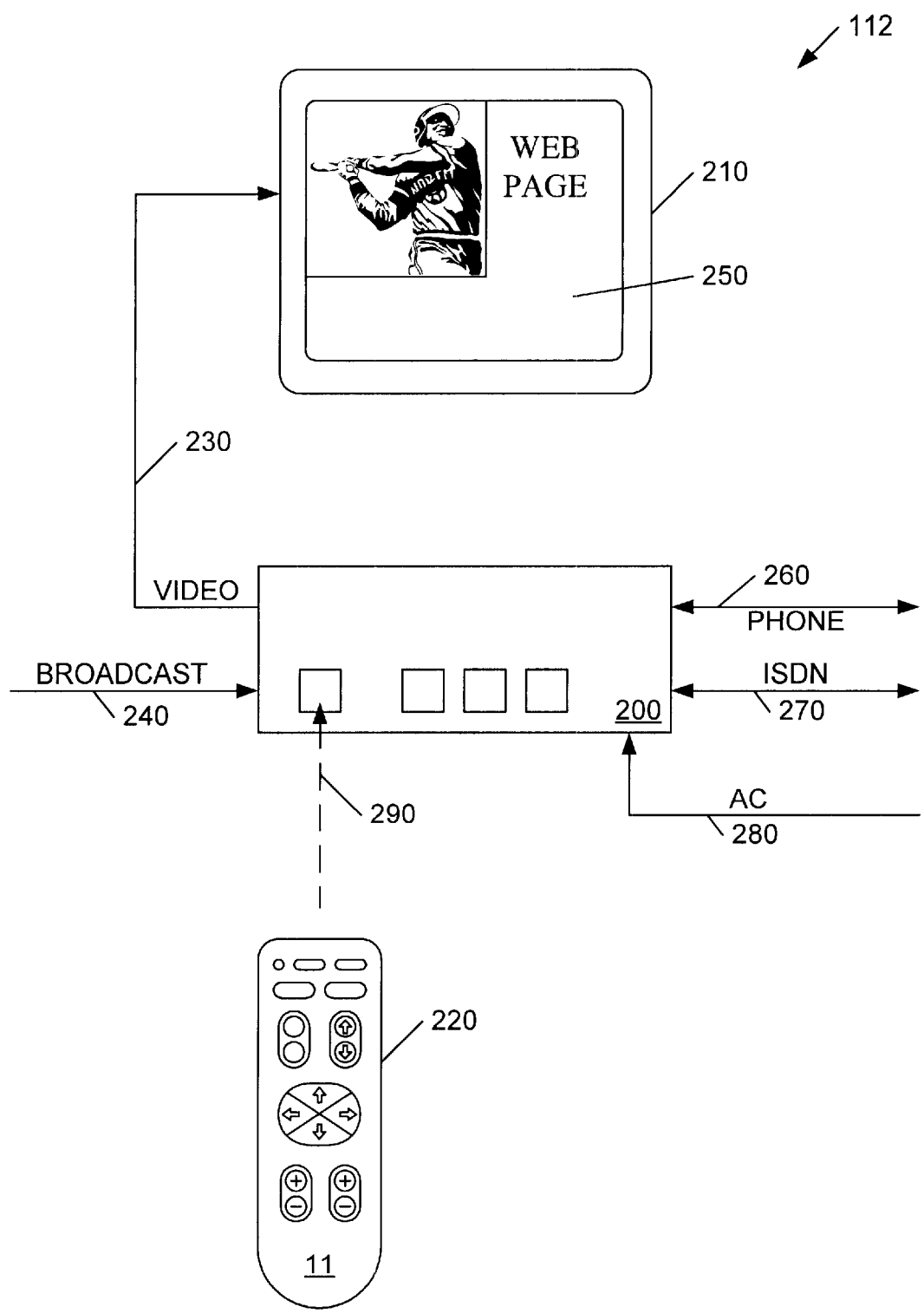
FIG. 2 (prior art) illustrates an embodiment of a receiver/client 112 for displaying broadcast television and Internet content.
Figure 3:
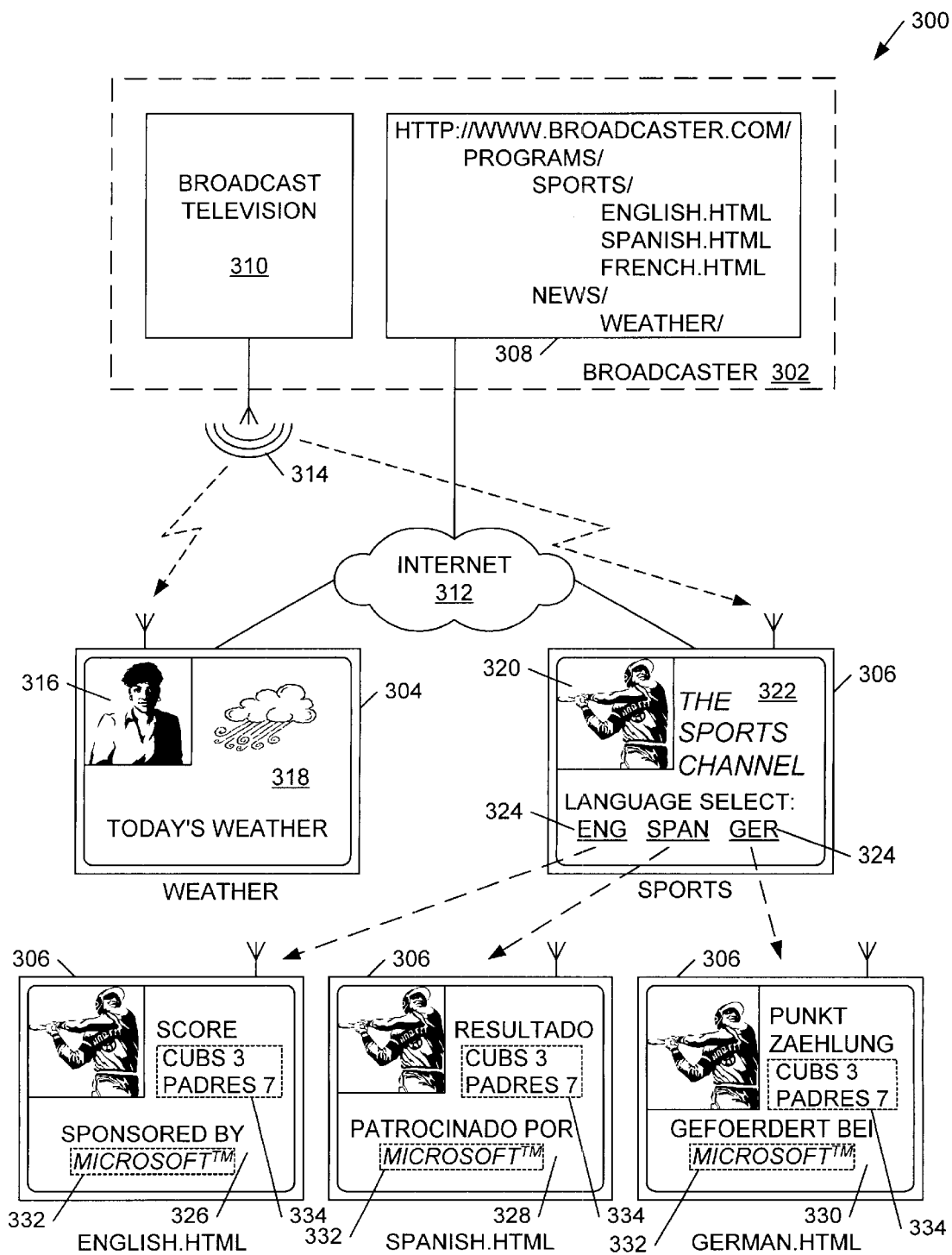
FIG. 3 illustrates a communication system 300, including a television content provider 302 and two content receivers 304 and 306.

The present invention reduces the bandwidth required to update a number of uniquely identified pages. The invention employs a trigger syntax that allows broadcasters to broadcast enhancement triggers addressed to collections of information resources, such as a related group of Web pages residing on one or many receivers. In the example of FIG. 3, content provider 302 can alter sponsor field 332 and/or score field 334 on all three of sports pages 326, 328, and 330 using a single enhancement trigger.

Figure 4:
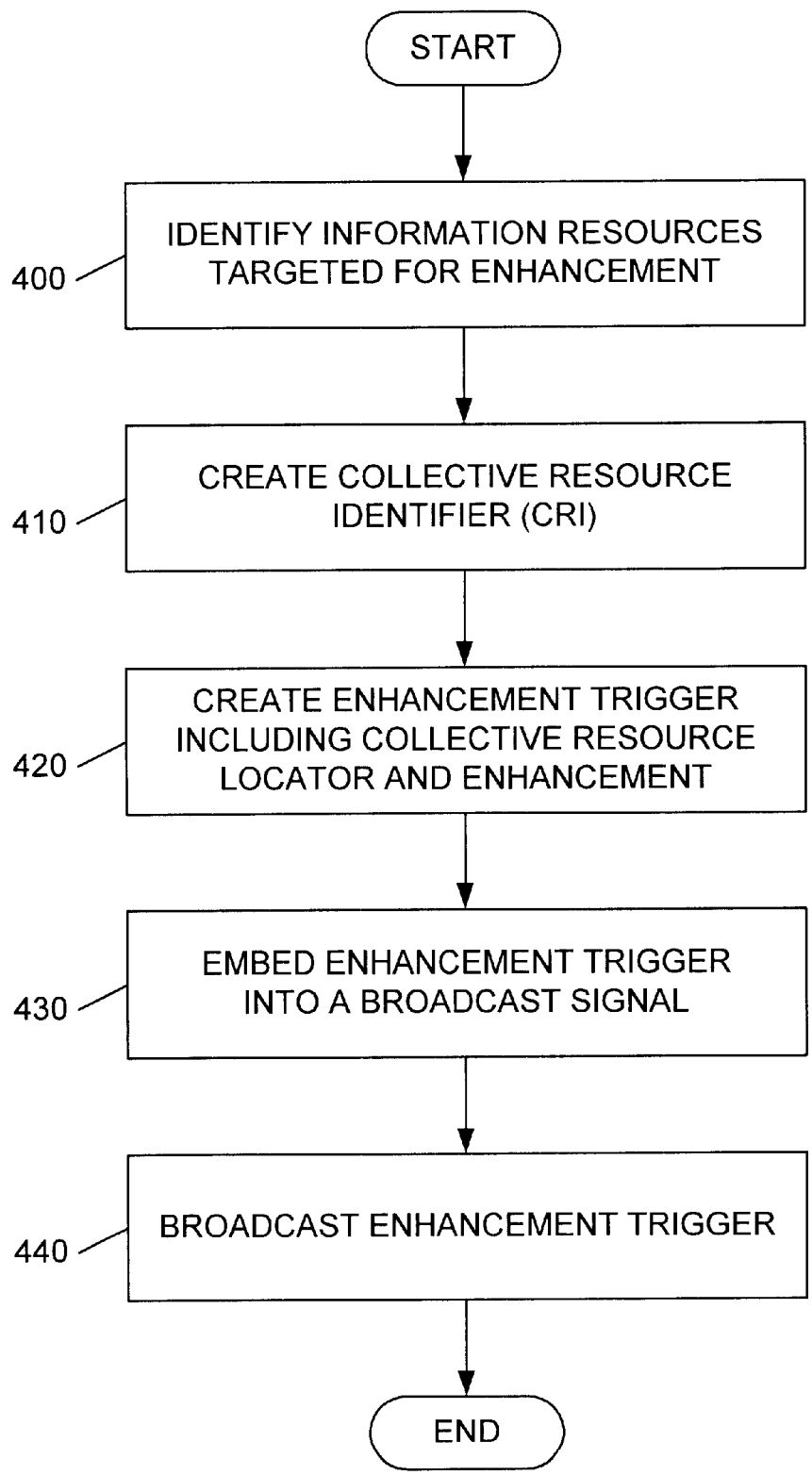
FIG. 4 is a flowchart depicting a method employed by a content creator (e.g., a program producer, broadcaster, affiliate, cable company or satellite provider) to broadcast an enhancement trigger to a number of uniquely identified information resources.

FIG. 4 is a flowchart depicting a method employed by a content creator (e.g., a program producer, broadcaster, affiliate, cable company or satellite provider) to broadcast an enhancement trigger to a number of uniquely identified information resources.

First, the content creator determines which information resources are to be targeted for the enhancement (step 400). For illustrative purposes, it will be assumed that Web pages 326, 328, and 330 are the information resources to be updated; in particular, it will be assumed that score attribute 334, resident on all three Web pages 326, 328, and 330, is to be changed to reflect that the score has changed to Cubs 4, Padres 7.

Having identified Web pages 326, 328, and 330 as the target information resources, content provider 302 creates a collective resource identifier (step 410) addressed to all of the targeted Web pages and not addressed to any other Web pages. Collective resource identifiers (CRIS) include: (1) a wildcard portion, and (2) a collective resource identifier portion. The collective resource identifier portion is identical to a portion of the URIs of the targeted Web pages. In one embodiment, the collective resource identifier for Web pages 326, 328, and 330 is:

http://www.broadcaster.com/programs/sports/* where the asterisk is the wildcard portion. The portion preceding the asterisk is the collective resource identifier specifying the collection of sports pages just beneath sports page 322 in the directory hierarchy of server 308. The wildcard character generally matches any file name, including english.html, spanish.html, and german.html, the portions of the respective pages 326, 328, and 330 that distinguish those pages from one another. Thus, the foregoing collective resource identifier can be used to simultaneously direct an enhancement trigger to each of pages 326, 328, and 330.

The use of wild cards can be confusing and can further lead to unexpected errors. One embodiment employs a number of syntactical rules that seek to avoid such confusion and errors. First, the wildcard character must follow the domain name (e.g., www.broadcaster.com). This ensures that broadcasters do not send enhancements to pages they did not author. Second, no subdirectories are allowed within the scope of the wildcard character. Were this not the case, an enhancement addressed to "http://www.broadcaster.com/*" would apply to weather page 318, sports page 322, and any other pages maintained under the domain name www.broadcaster.com. An enhancement so directed, a score update, for example, could produce errors when unintentionally addressed to pages without the resources required to receive score updates. Third, the second-to-last character in the collective resource trigger must be a "/". This further simplifies the syntax, avoiding some situations in which collective resource identifiers are misdirected. Such a situation might occur, for example, if the collective resource identifier http://www.broadcaster.com/pro* were intended to update a "programs" page and accidentally introduced errors on receivers displaying an unrelated "products" page. Other embodiments dispense with these syntactical rules in favor of increased flexibility.

Next, in step 420, content provider 302 creates an enhancement trigger addressed to Web pages 326, 328, and 330 using the above-defined collective resource identifier, or CRI. In one embodiment, each enhancement trigger addressed to more than one Web page includes a collective resource identifier followed by zero or more attribute/value pairs and an optional checksum, as follows:

<CRI> [attr$_1$:val$_1$] [attr$_2$:val$_2$] . . . [attr$_n$:val$_n$] [checksum]

The attribute/value pairs can be selected to achieve some desired interaction with the specified resource. A script attribute, formatted as [script:string], provides a script or script fragment to execute within the context of the page identified by the CRI. For example, [script:newScore(4,7)] might be addressed to pages 326, 328, and 330 to update score field 334 to read Cubs 4, Padres 7.

A "name" attribute, provides the user with readable text. For example "[name:WebTV]" could be used modify sponsor field 332 to identify WebTV as the sponsor of baseball game 306. The "name" attribute and the "script" attribute can each provide text messages. The script attribute is more powerful then the name attribute, however. Scripts can be appended to Web pages to change their function, or can be used to pass arguments to scripts already resident on Web pages.

A time stamp indicating a time after which the trigger expires follows an "expires" attribute. One embodiment employs the form yyyymmddThhmmss, where the capital letter "T" separates the date from the time. The "expires" attribute ensures that information contained in triggers is timely. Without this attribute, a rebroadcast of a show might provide an incorrect update, for example an erroneous stock quote.

A checksum is appended to the end of the logical address link to detect data corruption that may occur during receipt or transmission of a trigger. Preferably, a two byte hexadecimal checksum is employed such as a checksum that would be produced by the standard TCP/IP checksum algorithm described in Request For Comments (RFC) 791, "Internet Protocol, DARPA Internet Program Protocol Specification," September 1981, which is incorporated herein by reference. According to one embodiment, the checksum is computed by pairing adjacent characters in the string (starting with the first delimiter) to form 16-bit integers. If there is an odd number of characters, then the final character is paired with a byte of zeroes. The checksum is computed such that the one's complement sum of all of the 16-bit integers plus the checksum equals the 16-bit integer with all 1 bits.

For additional information regarding enhancement triggers, see the above-incorporated application entitled "Communicating Scripts in a Data Service Channel of a Video Signal." Additional information is provided in the Advanced Television Enhancement Forum Specification (ATVEF), Version 1.1 revision 26, (Feb. 2, 1999), also incorporated herein by reference.

Next, the content creator embeds the enhancement trigger into a broadcast video signal (step 430). In one embodiment, the video signal is a National Television Standards Committee (NTSC) video signal including a vertical blanking interval (VBI). The content creator embeds the enhancement trigger into a data service channel of the NTSC video signal selected from a captioning service channel or a text service channel. The video signal may also be Phase Alternate Lines (PAL), Sequential Couleur Avec Memoire (SECAM), High Definition Television (HDTV), or a digital video signal such as a Digital Video Broadcasting (DVB) signal or an Advanced Television Systems Committee (ATSC) signal.

Where the video signal is NTSC video signal, the enhancement trigger can be imbedded into line 21 of the vertical blanking interval (VBI). The protocols for broadcasting data in line 21 of the VBI call for relatively robust, low-speed communication. Higher bandwidth can be obtained using other lines of the VBI. Finally, the broadcaster broadcasts the video signal that includes the enhancement trigger (step 440).

The upstream video may contain previously encoded data. Each content creator is therefore a potential re-encoding point along the broadcast distribution path. At any re-encoding point, the existing data may be extracted from the captioning data channel or the text service channel of the video signal. Subject to certain bandwidth limitations, the content creator may then embed one or more enhancement triggers into a captioning or text service packet of the video signal. The video signal may then be transmitted to the next downstream receiving device(s). This process may be repeated during video signal processing at each point along the video signal distribution path.

Figure 5:
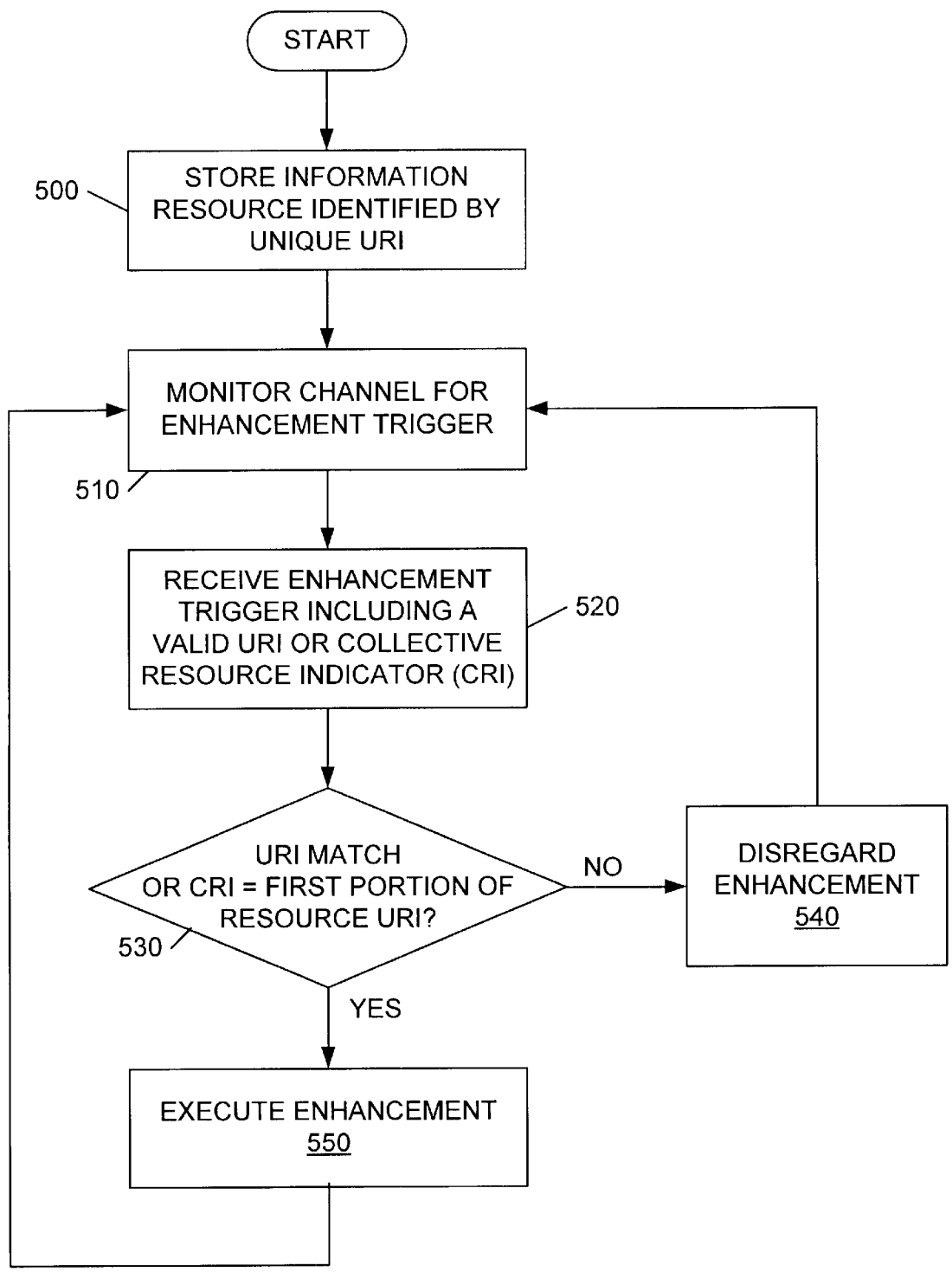
FIG. 5 is a flowchart depicting a method performed by a receiver (e.g., receiver 306) configured in accordance with the invention to respond to enhancement triggers addressed to more than one information resource.

FIG. 3 illustrates a communication system 300, including a television content provider 302 and two content receivers 304 and 306. FIG. 4 is a flowchart depicting a method employed by a content creator (e.g., a program producer, broadcaster, affiliate, cable company or satellite provider) to broadcast an enhancement trigger to a number of uniquely identified information resources. FIG. 5 is a flowchart depicting a method performed by a receiver (e.g., receiver 306) configured in accordance with the invention to respond to enhancement triggers addressed to more than one information resource. First, the receiver stores an information resource, such as Web page 326, locally in the receiver (step 500). The information resource can be stored in video memory for immediate display or elsewhere in memory, for example on a magnetic hard disk. The receiver can obtain the resource from any number of information sources, such as from a server on the Internet, from a broadcast signal, or from a local memory device, such as a hard-disk drive or CD-ROM drive.

Next, in step 510, the receiver monitors one or more broadcast channels for valid enhancement triggers addressed to the stored information resource. For example, where the information resource is identified by a URI, the receiver monitors broadcast video for enhancement triggers that include either a URI matching that of the information resource or a collective resource identifier (CRI) matching the high-order portion of the information resource. A valid enhancement trigger is one that is: (1) encoded in a predetermined syntax, such as the syntax described earlier; and (2) whose resource identifier and attribute/value pairs are not corrupted, as determined by a comparison of a checksum generated by the receiving device to the checksum accompanying the enhancement trigger. The receiver simply ignores invalid enhancement triggers.

Upon receipt of a valid enhancement trigger (step 520), the receiver determines whether the resource identifier associated with the enhancement trigger matches that of the information resource (decision 530). If the enhancement trigger includes a collective resource identifier (CRI), then the CRI must match the first, or high-level, portion of the URI identifying the information resource. If the enhancement trigger includes a URI, then the enhancement-trigger URI must identically match that of the information resource.

If the enhancement-trigger resource identifier does not match the URI of the information resource, then the receiver disregards the enhancement (step 540) and continues monitoring the broadcast channel. If, on the other hand, the resource identifier associated with the enhancement trigger matches that of the information resource, then the information resource executes the enhancement (step 550) and continues monitoring the broadcast channel (step 510).

In the embodiment of FIG. 5, unmatched CRIs are simply ignored. In other embodiments, the receiver responds to unmatched CRIS by dropping the wildcard character and then downloading the information resource associated with the resulting URI. For example, a receiver receiving an enhancement trigger directed to:

http://www.broadcaster.com/programs/sports/* might drop the asterisk and display the information resource identified by the resulting URI. Alternatively, the receiver might prompt the viewer for a decision as to whether to display the identified information resource.

The foregoing broadcast and receive methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

Figure 6:
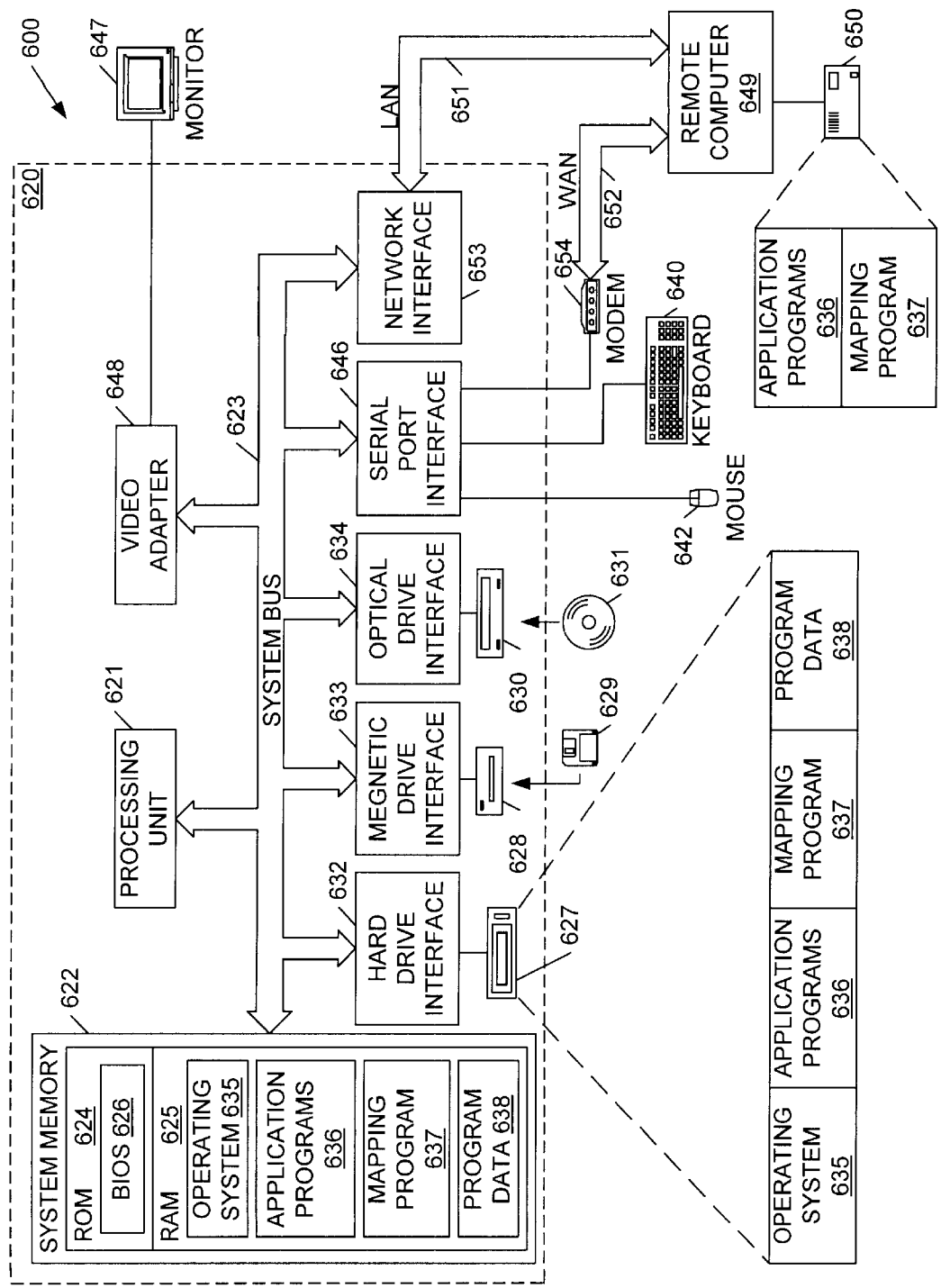
FIG. 6 (prior art) depicts a suitable computing system 600 that may be used by a content creator to create enhancement triggers for enhancing video broadcasts.

FIG. 6 and the following discussion are intended to provide a brief, general description of a suitable computing system 600 that may be used by a content creator to create enhancement triggers for enhancing video broadcasts. Computing system 600 can also be used to display and store information resources, and may be adapted to display broadcast video.

The invention is described above in the general context of computer-executable instructions, such as program modules, being executed by a personal computer or set-top box. Generally, program modules include routines, programs, objects, components, data structures, etc., that perform particular tasks or implement particular abstract data types. Those skilled in the art will appreciate that the invention may be practiced with other system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary computing system for implementing the invention includes a general-purpose computing device in the form of a conventional personal computer 620. Computer 620 includes a processing unit 621, a system memory 622, and a system bus 623 that couples various system components including the system memory to processing unit 621. system bus 623 may be any of several types of bus structures, including a memory bus or memory controller, a peripheral bus, and a local bus using any of a variety of bus architectures. The system memory includes read only memory (ROM) 624 and random access memory (RAM) 625. A basic input/output system 626 (BIOS), containing the basic routines that help to transfer information between elements within personal computer 620, such as during start-up, is stored in ROM 624. Personal computer 620 further includes a hard disk drive 627 for reading from and writing to a hard disk (not shown), a magnetic disk drive 628 for reading from or writing to a removable magnetic disk 629, and an optical disk drive 630 for reading from or writing to optical disk 631 such as a CD ROM. Hard disk drive 627, magnetic disk drive 628, and optical disk drive 630 are connected to system bus 623 by a hard-drive interface 632, a magnetic-drive interface 633, and an optical-drive interface 634, respectively. Other types of computer-readable media, such as magnetic cassettes, flash memory cards, digital video disks, Bernoulli cartridges, random access memories, read only memories, and the like, may also be used. The drives and their associated computer-readable media provide nonvolatile storage of computer readable instructions, data structures, program modules and other data for personal computer 620.

Program modules may be stored on the hard disk, magnetic disk 629, optical disk 631, ROM 624 or RAM 625. Such modules include an operating system 635, one or more application programs 636, a mapping program 637, and program data 638. A user may enter commands and information into personal computer 620 through input devices such as a keyboard 640 and pointing device 642. Other input devices (not shown) may include a microphone, joystick, game pad, satellite dish, scanner, or the like. These and other input devices are often connected to processing unit 621 through a serial port interface 646 that is coupled to the system bus, but may be connected by other interfaces, such as a parallel port, game port, or a universal serial bus (USB). A monitor 647 or other type of display device is also connected to system bus 623 via an interface, such as a video adapter 648. In addition to the monitor, personal computers typically include other peripheral output devices (not shown), such as speakers and printers.

Personal computer 620 may operate in a networked environment using logical connections to one or more remote computers, such as a remote computer 649. Remote computer 649 may be another personal computer, a server, a router, a network PC, a peer device or other common network node. Remote computer 649 typically includes many or all of the elements described above relative to personal computer 620, although only a memory storage device 650 has been illustrated in FIG. 6. The logical connections depicted in FIG. 6 include a local area network (LAN) 651 and a wide area network (WAN) 652. Such networking environments are commonplace in offices, enterprise-wide computer networks, intranets and the Internet.

When used in a LAN networking environment, personal computer 620 is connected to local network 651 through a network interface or adapter 653. When used in a WAN networking environment, personal computer 620 typically includes a modem 654 or other means for establishing communications over wide area network 652, such as the Internet. Modem 654, which may be internal or external, is connected to system bus 623 via serial port interface 646. In a networked environment, program modules depicted relative to personal computer 620, or portions thereof, may be stored in remote memory storage devices. The network connections shown are exemplary and other means of establishing a communications link between the computers may be used.

While the present invention has been described in connection with specific embodiments, variations of these embodiments will be apparent. For example, collective resource identifiers can employ more complex syntax that allows for different types and numbers of wildcard characters. Accordingly, various modifications, adaptations, and combinations of various features of the described embodiments can be practiced without departing from the scope of the invention set forth in the following claims.

REFERENCES

The following references provide additional background information relating to the present invention, and are incorporated herein by reference.
1. W3C, "HTML 4.0 Specification," chapters 1–18 (April 1998), identified as page "http://www.w3.org/TR/REC-html40/".
2. ECMA—European association for standardizing information and communication systems, "Standard ECMA-262, 2$^{nd}$ Edition" (August 1998), the ECMAScript Language Specification.
3. W3C, "Document Object Model (DOM) Level 1 Specification" (October 1998), identified as page http://www.w3.org/TR/1998/REC-DOM-Level-1-19981001/DOM.txt.
4. R. Panabaker, S. Wegerif, and D. Zigmond, "The Transmission of IP Over the Vertical Blanking Interval of a Television Signal," (February 1999), identified as page "http://www.ietf.org/internet-drafts/draft-ietf-ipvbi-nabts-02.txt".
5. S. Deering, "Host Extension for IP Multicasting" (August 1989).
6. Electronic Industries Association EIA-608, "Recommended Practice for Line 21 Data Service" (September 1994).
7. Electronic Industries Association EIA-746A, "Transport of Internet Uniform Resource Locator (URL) Information Using Text-2 (T-2) Service" (September 1998).
8. J. Postel, "User Datagram Protocol," (August 1980), identified as page "ftp://ftp.isi.edu/in-notes/rfc768.txt".

What is claimed is:

1. In a system that includes a server system and a plurality of client receiver systems that are configured to receive i) broadcast video signals on one or more video channels, and ii) information content downloaded from the server system, a method for updating a plurality of information resources at the plurality of client receiver systems, but doing so in a manner that reduces bandwidth requirements, the method comprising:

identifying a plurality of information resources that require updating;

of those information resources that require updating, identifying which information resources have a data field that has at least one common attribute shared by at least one other data field of one of the other information resources that require updating;

for each common attribute that is shared by at least one other data field, generating a collective resource identifier that exclusively identifies all information resources that share at least one common attribute with one other data field of another information resource;

for each collective resource identifier, embedding an enhancement trigger into the broadcast video signal, the enhancement trigger comprising the collective resource identifier and enhancement data to be used to update the common attributes of the information resources;

broadcasting, by the broadcast signal source, the video signal; and processing, at one or more of the plurality of client receivers, the enhancement triggers received with the broadcast video signal by updating the common attributes of the information resources with the enhancement data.

2. The method of claim 1, wherein the plurality of information resources are each identified by a unique resource identifier having a first portion and a second portion, wherein the first portions are identical and the second portions are different.

3. The method of claim 2, wherein the second portion of the unique resource identifier uniquely identifies the information resources having a data field that has at least one common attribute.

4. The method of claim 2, wherein each collective resource identifier includes a collective resource identifier portion identical to the first portion of each respective unique resource identifier.

5. The method of claim 2, wherein each collective resource identifier includes a collective resource identifier portion identical to the first portion of each respective unique resource identifier and a wildcard character.

6. The method of claim 1, wherein the broadcast video signal comprises a data service channel, and wherein each collective resource identifier is embedded into the data service channel.

7. The method of claim 6, wherein the data service channel is selected from a captioning service channel or a text service channel.

8. The method of claim 1, further comprising embedding a script in the broadcast video signal along with each collective resource identifier, thereby directing the script to the plurality of information resources.

9. The method of claim 2, wherein the unique resource identifiers are URIs.

10. The method of claim 1, wherein each information resource is a web page.

11. The method of claim 1, further comprising displaying a video portion of the broadcast video signal, wherein the enhancement trigger synchronizes two or more information resources with the video portion of the broadcast video signal.

12. The method of claim 1, wherein the plurality of information resources includes a first information resource that is a first HTML page and a second information resource that is a second HTML page.

13. The method of claim 1, wherein the broadcast video signal is broadcast as a National Television Standards Committee (NTSC) video signal including a vertical blanking interval (VBI).

14. The method of claim 1, wherein the broadcast video signal is broadcast as a signal selected from a group consisting Phase Alternate Lines (PAL), Sequential Couleur Avec Memoire (SECAM), High Definition Television (HDTV), Digital Video Broadcasting (DVB), or Advanced Television Systems Committee (ATSC).

15. A computer program product for use in a system that includes a server system and a plurality of client receiver systems that are configured to receive i) broadcast video signals on one or more video channels, and ii) information content downloaded from the server system, the computer program product comprising:

a computer readable medium for storing computer-executable instructions, where said computer-executable instructions implement a method for updating a plurality of information resources at the plurality of client receiver systems, but doing so in a manner that reduces bandwidth requirements, the method comprising:

identifying a plurality of information resources that require updating;

of those information resources that require updating, identifying which information resources have a data field that has at least one common attribute shared by at least one other data field of one of the other information resources that require updating;

for each common attribute that is shared by at least one other data field, generating a collective resource identifier that exclusively identifies all information resources that share at least one common attribute with one other data field of another information resource;

for each collective resource identifier, embedding an enhancement trigger into the broadcast video signal, the enhancement trigger comprising the collective resource identifier and enhancement data to be used to update the common attributes of the information resources;

broadcasting, by the broadcast signal source, the video signal; and processing, at one or more of the plurality of client receivers, the enhancement triggers received with the broadcast video signal by updating the common attributes of the information resources with the enhancement data.

16. A computer program product as recited in claim 15, wherein the plurality of information resources are each identified by a unique resource identifier having a first portion and a second portion, wherein the first portions are identical and the second portions are different.

17. A computer program product as recited in claim 16, wherein the second portion of the unique resource identifier uniquely identifies the information resources having a data field that has at least one common attribute.

18. A computer program product as recited in claim 16, wherein each collective resource identifier includes a collective resource identifier portion identical to the first portion of each respective unique resource identifier.

19. A computer program product as recited in claim 16, wherein each collective resource identifier includes a collective resource identifier portion identical to the first portion of each respective unique resource identifier and a wildcard character.

20. A computer program product as recited in claim 16, wherein the unique resource identifiers are URIs.

21. A computer program product as recited in claim 15, wherein the broadcast video signal comprises a data service channel, and wherein each collective resource identifier is embedded into the data service channel.

22. A computer program product as recited in claim 21, wherein the data service channel is selected from a captioning service channel or a text service channel.

23. A computer program product as recited in claim 15, wherein the method further comprises embedding a script in the broadcast video signal along with each collective resource identifier, thereby directing the script to the plurality of information resources.

24. A computer program product as recited in claim 15, wherein each information resource is a web page.

25. A computer program product as recited in claim 15, wherein the method further comprises displaying a video portion of the broadcast video signal, and wherein the enhancement trigger synchronizes two or more information resources with the video portion of the broadcast video signal.

26. A computer program product as recited in claim 15, wherein the plurality of information resources includes a first information resource that is a first HTML page and a second information resource that is a second HTML page.

27. A computer program product as recited in claim 15, wherein the broadcast video signal is broadcast as a signal selected from a group consisting Phase Alternate Lines (PAL), Sequential Couleur Avec Memoire (SECAM), High Definition Television (HDTV), Digital Video Broadcasting (DVB), or Advanced Television Systems Committee (ATSC).

* * * * *

UNITED STATES PATENT AND TRADEMARK OFFICE
CERTIFICATE OF CORRECTION

PATENT NO. : 6,560,777 B2
DATED : May 6, 2003
INVENTOR(S) : Dean J. Blackketter, Daniel J. Zigmond and Timothy F. Park It is certified that error appears in the above-identified patent and that said Letters Patent is hereby corrected as shown below:

Column 1,
Line 42, after "data connections 130" please insert -- , --

Column 2,
Line 28, after "Signal,'" please delete "f"
Line 50, after "includes" please delete "links" and insert -- link --
Line 53, after "one of" please delete "links" and insert -- link --

Column 3,
Line 4, after "server 308" please delete ". Www.broadcaster.com" and insert
-- www.broadcastercom --

Column 5,
Line 9, after "resource identifiers" please delete "(CRIS)" and insert -- (CRIs) --
Line 39, after "the domain name www" please delete "-"

Column 6,
Line 6, after "could be used" please insert -- to --

Column 7,
Line 63, after "unmatached" please delete "CRIS" and insert -- CRIs --

Column 8,
Line 43, after "unit 621." please delete "system" and insert -- System --

Column 11,
Line 35, before "Phase Alternate" please insert -- of: --

UNITED STATES PATENT AND TRADEMARK OFFICE
CERTIFICATE OF CORRECTION

PATENT NO.    : 6,560,777 B2
DATED         : May 6, 2003
INVENTOR(S)   : Dean J. Blackketter, Daniel J. Zigmond and Timothy F. Park It is certified that error appears in the above-identified patent and that said Letters Patent is hereby corrected as shown below:

<u>Column 12,</u>
Line 60, after "a group consisting" please insert -- of: --

Signed and Sealed this

Sixth Day of April, 2004

JON W. DUDAS
*Acting Director of the United States Patent and Trademark Office*